(12) United States Patent
Delgoshaei et al.

(10) Patent No.: US 10,353,369 B2
(45) Date of Patent: Jul. 16, 2019

(54) HVAC SYSTEM DETECTING USER DISCOMFORT

(71) Applicant: Lennox Industries Inc., Richardson, TX (US)

(72) Inventors: Payam Delgoshaei, Addison, TX (US); Sridhar Venkatesh, Irving, TX (US)

(73) Assignee: Lennox Industries, Inc., Richardson, TX (US)

( * ) Notice: Subject to any disclaimer, the term of this patent is extended or adjusted under 35 U.S.C. 154(b) by 0 days.

(21) Appl. No.: 15/655,428

(22) Filed: Jul. 20, 2017

(65) Prior Publication Data

US 2019/0024920 A1    Jan. 24, 2019

(51) Int. Cl.
| | |
|---|---|
| *F24F 120/20* | (2018.01) |
| *G05B 19/048* | (2006.01) |
| *F24F 11/89* | (2018.01) |
| *F24F 11/30* | (2018.01) |
| *F24F 11/62* | (2018.01) |
| *F24F 110/10* | (2018.01) |
| *F24F 11/56* | (2018.01) |
| *F24F 11/64* | (2018.01) |
| *F24F 120/12* | (2018.01) |
| *F24F 120/10* | (2018.01) |

(52) U.S. Cl.
CPC ............ *G05B 19/048* (2013.01); *F24F 11/30* (2018.01); *F24F 11/62* (2018.01); *F24F 11/89* (2018.01); *F24F 11/56* (2018.01); *F24F 11/64* (2018.01); *F24F 2110/10* (2018.01); *F24F 2120/10* (2018.01); *F24F 2120/12* (2018.01); *F24F 2120/20* (2018.01); *G05B 2219/2614* (2013.01)

(58) Field of Classification Search
None
See application file for complete search history.

(56) References Cited

U.S. PATENT DOCUMENTS

2007/0138307 A1* 6/2007 Khoo ...................... F24F 11/30
                                                                        236/1 C
2009/0276528 A1* 11/2009 Pienta ..................... G06F 1/206
                                                                        709/226

(Continued)

*Primary Examiner* — Thomas C Lee
*Assistant Examiner* — Gary Collins
(74) *Attorney, Agent, or Firm* — Baker Botts L.L.P.

(57) ABSTRACT

A controller for an HVAC system comprises an interface, a memory, and a processor. The interface receives data related to user interactions with the system, and receives a temperature of the enclosed space. The memory stores an accumulated user discomfort value and discomfort score values, associated with user interactions. The processor determines a difference between the enclosed space temperature and a setpoint temperature. The processor determines whether the temperature difference exceeds a first threshold, and in response to determining that, determine whether a user has interacted with the system. In response to determining that the user has interacted with the system, the processor determines a current user discomfort value based on the discomfort score values, updates the accumulated user discomfort value, and determines whether the accumulated user discomfort value exceeds a second threshold. In response to determining that, the processor generates an alert indicating that a user discomfort event has occurred.

20 Claims, 4 Drawing Sheets

(56) References Cited

U.S. PATENT DOCUMENTS

| | | | | |
|---|---|---|---|---|
| 2010/0280667 A1* | 11/2010 | Steinberg | ........... | G05D 23/1902 |
| | | | | 700/276 |
| 2012/0031984 A1* | 2/2012 | Feldmeier | ................ | F24F 11/30 |
| | | | | 236/49.3 |
| 2013/0060385 A1* | 3/2013 | Leen | .................... | F24F 11/0009 |
| | | | | 700/276 |
| 2013/0158723 A1* | 6/2013 | Erickson | .............. | F24F 11/0086 |
| | | | | 700/278 |
| 2014/0031989 A1* | 1/2014 | Bergman | ................. | F24F 11/30 |
| | | | | 700/276 |
| 2014/0096946 A1* | 4/2014 | Rognli | ................ | F24D 19/1084 |
| | | | | 165/209 |
| 2014/0374496 A1* | 12/2014 | Miura | ............................ | 236/47 |
| 2015/0127174 A1* | 5/2015 | Quam | ...................... | F24F 11/63 |
| | | | | 700/276 |
| 2015/0286213 A1* | 10/2015 | Roosli | ...................... | F24F 11/30 |
| | | | | 702/182 |
| 2016/0018832 A1* | 1/2016 | Frank | .................... | H04W 4/021 |
| | | | | 700/276 |
| 2016/0089955 A1* | 3/2016 | Ham | .................. | B60H 1/00742 |
| | | | | 165/202 |
| 2016/0223215 A1* | 8/2016 | Buda | ...................... | G05B 15/02 |
| 2018/0198637 A1* | 7/2018 | Combe | .............. | H04L 12/2825 |
| 2018/0316517 A1* | 11/2018 | Henzig | .............. | H04L 12/2827 |

* cited by examiner

HVAC SYSTEM DETECTING USER DISCOMFORT

TECHNICAL FIELD

This disclosure relates generally to a heating, ventilation, and air conditioning (HVAC) system. More specifically, this disclosure relates to an HVAC system identifying user discomfort, for example, based on a user's interactions with the system.

BACKGROUND

HVAC systems can be used to regulate the environment within an enclosed space. Various types of HVAC systems, such as residential and commercial, may be used to provide cool air, for example during hot times of the year, and/or provide heat, for example, during cooler times of the year. Providing heating and/or cooling may be important for user comfort levels. If adequate heating and/or cooling is not provided, a user may be uncomfortable in the enclosed space.

SUMMARY

In certain embodiments, a controller for an HVAC system comprises an interface, a memory, and a processor. The interface configured to receive data related to user interactions with the system, and receive a temperature of the enclosed space. The memory is configured to store an accumulated user discomfort value and discomfort score values. These discomfort score values may be associated with user interactions. The processor is communicatively coupled to the memory and the interface. The processor is configured to determine a temperature difference between the temperature of the enclosed space and a setpoint temperature. The processor is further configured to determine whether the temperature difference exceeds a first threshold, and in response to determining that the temperature difference exceeds the first threshold, determine whether a user has interacted with the system based on the data related to user interactions. In response to determining that the user has interacted with the system based on the data related to user interactions, the processor is further configured to determine a current user discomfort value based on the discomfort score values, update the accumulated user discomfort value based on the current user discomfort value, and determine whether the accumulated user discomfort value exceeds a second threshold. Further, in response to determining that the accumulated user discomfort value exceeds a second threshold, the processor is configured to generate an alert indicating that a user discomfort event has occurred.

In one embodiment, a heating, ventilation, and air conditioning (HVAC) system operating in an enclosed space comprises a thermostat in the enclosed space, a mobile device, and a controller communicatively coupled to the thermostat and the mobile device. Both the thermostat and the mobile device are configured to display information to a user and receive instructions from the user. The controller is configured to store an accumulated user discomfort value and discomfort score values, the discomfort score values associated with user interactions. The controller is further configured to receive a temperature of the enclosed space and determine a temperature difference, where the temperature difference is a difference between the temperature of the enclosed space and an occupied setpoint temperature. The controller is further configured to determine whether the temperature difference exceeds a first threshold. The controller may also receive data related to user interactions with the system, and in response to determining that the temperature difference exceeds the first threshold, determine whether a user has interacted with the system based on the data related to user interactions. The controller is further configured to, in response to determining that the user has interacted with the system based on the data related to user interactions: determine a current user discomfort value based on the discomfort score values, update the accumulated user discomfort value based on the current user discomfort value, determine whether the accumulated user discomfort value exceeds a second threshold, and in response to determining that the accumulated user discomfort value exceeds a second threshold, generate an alert indicating that a user discomfort event has occurred.

In one embodiment, a non-transitory computer readable medium comprising instructions which, when executed by a computer, cause the computer to store an accumulated user discomfort value and discomfort score values, the discomfort score values associated with user interactions. The instructions cause the computer to further receive a temperature of the enclosed space and determine a temperature difference, where the temperature difference is a difference between the temperature of the enclosed space and an occupied setpoint temperature. The instructions cause the computer to further determine whether the temperature difference exceeds a first threshold. The instructions cause the computer to further receive data related to user interactions with the system, and in response to determining that the temperature difference exceeds the first threshold, determine whether a user has interacted with the system based on the data related to user interactions. The instructions cause the computer to further, in response to determining that the user has interacted with the system based on the data related to user interactions: determine a current user discomfort value based on the discomfort score values, update the accumulated user discomfort value based on the current user discomfort value, determine whether the accumulated user discomfort value exceeds a second threshold, and in response to determining that the accumulated user discomfort value exceeds a second threshold, generate an alert indicating that a user discomfort event has occurred.

Certain embodiments of the disclosure may include none, some, or all of the above technical advantages. For example, detecting temperature issues and user discomfort may have the manufacturer visit the site at an earlier time, thus reducing the likelihood of further or permanent damage to the HVAC system. As another example, when the HVAC system can determine user discomfort, resources may be conserved because the system may automatically adjust certain settings so that the system may operate in an efficient and useful manner. Finally, manufacturers may be able to prioritize or determine which users and locations require the most attention, thus conversing and focusing resources on HVAC systems with the most (or potential for the most) issues. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

By delivering conditioned air to an enclosed space, a heating, ventilation, and air conditioning system (HVAC) provides a certain amount of user comfort. Typically, an HVAC system is set to a certain temperature and provides conditioned air (e.g., heating or cooling) such that the enclosed space maintains that temperature. Although HVAC systems may determine whether the enclosed space is meeting the temperature setpoint, that does not indicate whether a user is experiencing discomfort or not. For example, one user may set the HVAC system to 70 degrees Fahrenheit, but the user may remain comfortable even if the temperature of the enclosed space reaches 73 degrees Fahrenheit. However, another user may set the HVAC system to 70 degrees Fahrenheit, and notice when the temperature of the enclosed space reaches 71 degrees Fahrenheit. It would be beneficial to manufacturers, dealers, and/or other maintenance systems to understand which users are experiencing discomfort, as opposed to those who are not. By receiving data about a user's interaction with an interface, the HVAC system may be able to determine whether a user is experiencing discomfort. For example, when a user is uncomfortable, the user may check the thermostat in the enclosed space, open an application on the user's mobile device to check the system, change the occupied setpoint temperature of the HVAC system, and/or interact with the HVAC system in another way. Using information about these interactions, the HVAC system may determine that a user is experiencing discomfort, and take appropriate remedial action.

Embodiments of the present disclosure and its advantages are best understood by referring to FIGS. 1 through 4 of the drawings, like numerals being used for like and corresponding parts of the various drawings.

Figure 1:
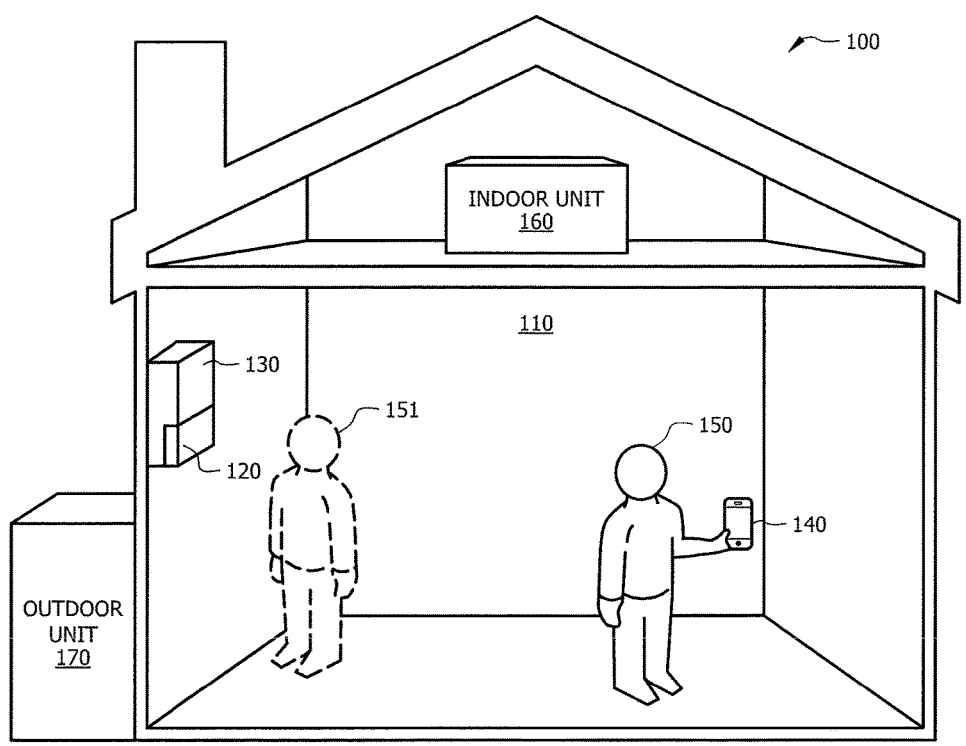
FIG. 1 illustrates a block diagram of an example System 100 for providing conditioned air to an enclosed space.

FIG. 1 illustrates a block diagram of an example System 100 for providing conditioned air to enclosed space 110. System 100 may provide heating, ventilation, or air conditioned air to a space. Although FIG. 1 shows System 100 being a residential system, System 100 may be used in residential or commercial buildings, and in refrigeration, and thus the embodiment shown in FIG. 1 should not be construed as limiting.

In certain embodiments, System 100 comprises enclosed space 110, controller 120, thermostat 130, mobile device 150, indoor unit 160, outdoor unit 170, and users 150-151. System 100 is configured to provide conditioned air to enclosed space 110. Users 150-151 may inhabit, work, or be present in enclosed space 110, and require that enclosed space have a certain temperature. Users 150-151 may control the settings of System 100 using thermostat 130 and/or mobile device 140.

In some embodiments, system 100 includes indoor unit 160 and outdoor unit 170 to provide conditioned air to enclosed space 110. Indoor unit 160 may include a circulation fan and refrigerant evaporator coil, and outdoor unit 170 may include one or more compressors and associated condenser coil(s). Indoor unit 160 and outdoor unit 160 may be connected via a refrigerant line. Although illustrated in specific areas around or within enclosed space 110, indoor unit 160 and outdoor unit 170 may be located anywhere within or around enclosed space 110, and FIG. 1 is not intended to be limiting.

In some embodiments, thermostat 130 provides an interactive display to user 150. Thermostat 130 may display information about System 100, such as the occupied setpoint temperature, the operating mode (e.g., heating or cooling), the outdoor temperature, the temperature of enclosed space 110, and any other information related to System 100. Thermostat 130 may allow a user to control the operation of System 100, such as changing the operating mode and/or occupied setpoint temperature. In some embodiments, thermostat 130 may have a motion sensor, such that it can determine when user 150 is in proximity to the display. For example, if user 150 stands in front of thermostat 130 (e.g., as depicted by user 151), thermostat 130 may be able to capture data to determine the proximity and the time that user 150 is in front of thermostat 130. Thermostat 130 may provide this information to controller 120. In some embodiments, thermostat 130 may be configured to sense the temperature of the air surrounding it. For example, thermostat 130 may include thermistors, thermocouples, resistive temperature devices, infrared sensors, thermometers, or any device configured to sense the temperature of the air surrounding the sensor. In some embodiments, thermostat 130 may be configured to transmit one or more signals to controller 120 indicating the temperature data.

In some embodiments, mobile device 140 may refer to any device that facilitates user 150 interacting with System 100. In some embodiments, mobile device 140 may include a computer, workstation, telephone, Internet browser, electronic notebook, Personal Digital Assistant (PDA), pager, or any other suitable device (wireless, wireline, or otherwise), component, or element capable of receiving, processing, storing, and/or communicating information with other components of System 100. Mobile device 140 may also comprise any suitable user interface such as a display, microphone, keyboard, or any other appropriate terminal equipment usable by user 150. System 100 may comprise any number and combination of mobile devices 150. User 150 utilizes mobile device 140 to interact with System 100. Mobile device 140 may display information about System 100, such as the occupied setpoint temperature, the operating mode (e.g., heating or cooling), the outdoor temperature, the temperature of enclosed space 110, and any other information related to System 100. Mobile device 140 may allow user 150 to control the operation of System 100, such as changing the operating mode and/or occupied setpoint temperature.

In some embodiments, mobile device 140 may determine whether and how long user 150 is interacting with System 100 (e.g., through an application on mobile device 140). Mobile device 140 may provide this information to controller 120. In some embodiments, mobile device 140 may provide location data to controller 120. For example, using GPS, WiFi, or another locating determining system, mobile device 140 may provide location data to controller 120, such that controller 120 knows the location of mobile device 140. For example, controller 120 may determine how far away mobile device 140 is from enclosed space 110, whether it is within a certain distance (e.g., set radius) away from HVAC system 110, and/or whether mobile device 140 is within enclosed space 110.

System 100 may include at least one controller 120 in some embodiments. Controller 120 may be configured to direct the operations of System 100. Controller 120 may be communicatively coupled to one or more components of System 100 (e.g., thermostat 130, mobile device 140). A conventional cable and contacts may be used to couple controller 120 to the various components of System 100 via the controller interface. In other embodiments, a wireless connection may also be employed to provide at least some of the connections. In some embodiments, controller 120 may be a server that is located within enclosed space 110 or remote from this location (e.g., a cloud server). Data may be sent to and received from controller 120 (e.g., remote server) using either a wired or wireless connection.

Controller 120 may be configured to control the operations of one or more components of System 100. For example, controller 120 may be configured to turn components on and off to ensure System 100 supplies appropriately conditioned air to enclosed space 110. As another example, controller 120 may be configured to change the occupied setpoint temperature based on the location of mobile device 140 (e.g., is mobile device 140 within a specified radius such that conditioned air should start being provided to enclosed space 110). In some embodiments, controller 120 may further be configured to receive information about System 100 from one or more sensors. As an example, controller 120 may receive information about the ambient temperature of the environment (e.g., environment in enclosed space 110 and/or outside of enclosed space 110) from one or more sensors. As another example, controller 120 may receive information about the proximity of user 150 to thermostat 130, including the amount of time user 150 spent in the proximity. As yet another example, controller 120 may receive information from mobile device 140 about its location and/or whether user 150 has opened the HVAC system application on mobile device 140.

In operation, controller 120 may determine whether a user discomfort event has occurred, and take appropriate remedial action based on that discomfort. Specifically, controller 120 may determine whether there is a temperature difference between the temperature of enclosed space 110 and a setpoint temperature (e.g., unoccupied setpoint temperature or occupied setpoint temperature). If the temperature difference exceeds a first threshold, controller 120 may determine whether a user has interacted with the system. As examples of a user interaction, controller 120 may determine whether user 150 was in the proximity of thermostat 130 (e.g., as depicted in user 151), whether user 150 changed the occupied setpoint temperature either at thermostat 130 or through mobile device 150, and/or whether user 150 opened the HVAC system application on mobile device 140. In response to determining that the user has interacted with the system, controller 120 determines the degree of user discomfort based on the number and significance of the user interactions. For example, if a user merely checks thermostat 130 for two seconds that may be a lower user discomfort value than if a user stands in front of thermostat 130 for 30 seconds and changes the occupied setpoint temperature by 5 degrees Fahrenheit. Taking into account all of the user interactions within a certain time period, controller 120 may determine an accumulated user discomfort value and whether it exceeds a certain threshold. If so, controller 120 may generate an alert indicating that a user discomfort event has occurred. In some embodiments, controller 120 may further transmit the alert to mobile device 140, a third party (e.g., dealer, manufacturer, maintenance team), change settings of System 100 to remedy the discomfort, and/or provide additional display data to indicate the amount of user discomfort. By taking remedial actions, system 100 may conserve resources by automatically adjusting the system. Further, system 100 may identify issues earlier that a user, which allows system 100 and its components to receive maintenance at an earlier point in time, thus reducing the likelihood of any long-term or permanent damage. The operation of system 100 is described in further detail below with respect to FIGS. 2 and 3.

Modifications, additions, or omissions may be made to the systems described herein without departing from the scope of the disclosure. For example, System 100 may include any number of controllers 120, enclosed spaces 110, thermostats 130, mobile devices 140, and users 150. The components may be integrated or separated. Moreover, the operations may be performed by more, fewer, or other components. Additionally, the operations may be performed using any suitable logic comprising software, hardware, and/or other logic.

Figure 2:
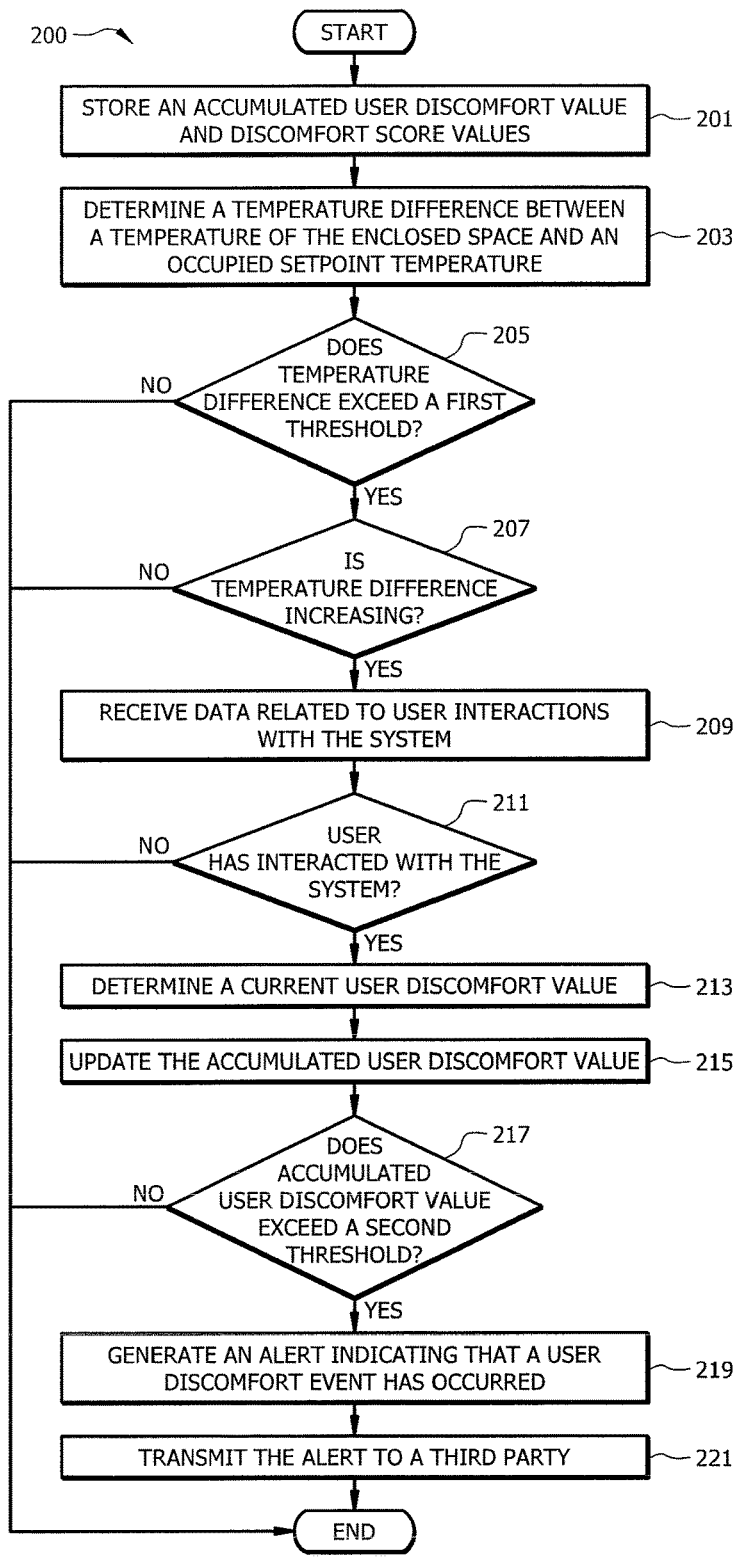
FIG. 2 is a flowchart illustrating a method of operating the example HVAC system of FIG. 1.

FIG. 2 is a flowchart illustrating method 200, a method of operating the example System 100 of FIG. 1. In method 200 generally, System 100 is not meeting an occupied setpoint temperature, and the temperature of enclosed space 110 is moving further away from the occupied setpoint temperature (e.g., the occupied setpoint temperature is 70° F., but enclosed space 110 is at 73° F. and the temperature is increasing). When this is occurring, System 100 may detect that user 150 has interacted with system 100 (e.g., checked the display on thermostat 130) and is able to infer how uncomfortable user 150 is based on the various interactions with the system over a period of time (e.g., user 150 checked the display 5 times within an hour). Once System 100 determines a user is uncomfortable, it can relay that information to a third party (e.g., maintenance group and/or dealer), who then may contact the user to set up an appointment to check on the system and potentially repair it. This is beneficial because it allows the maintenance team to preempt any permanent damage to system 100, and to provide better customer service to those users 150 whose frustrations have not escalated to the point of requesting maintenance, but are experiencing frustration, as indicated by their interactions with the system. Method 200 begins at step 201.

Figure 4:
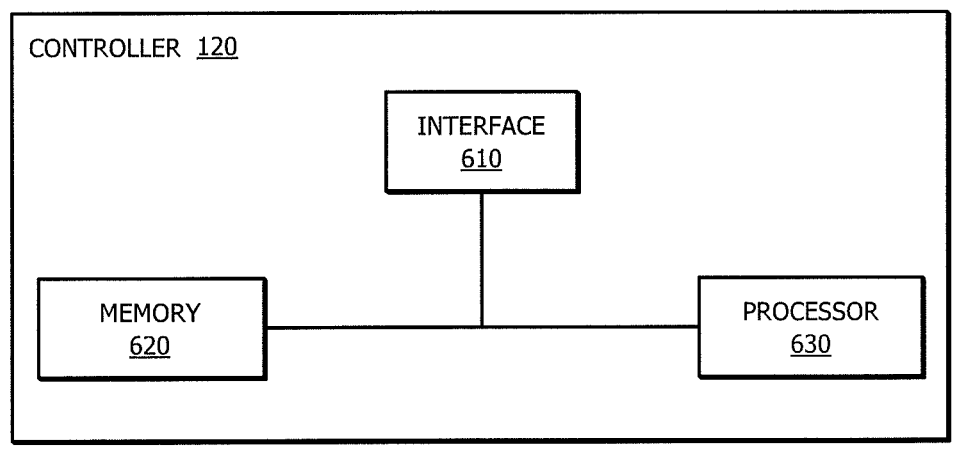
FIG. 4 illustrates an example of a controller of a refrigeration system, according to certain embodiments.

At step 201, in some embodiments, controller 120 stores an accumulated user discomfort value and discomfort score values. In some embodiments, controller 120 stores accumulated user discomfort value and discomfort score values in memory 620 as shown in FIG. 4. The accumulated user discomfort value may track a user's discomfort over a period of time. For example, if there are multiple user interactions with system 100, each may have an individual value (e.g., current user discomfort value) that may be aggregated to determine an accumulated user discomfort value. In some embodiments, discomfort score values may include certain values associated with user interactions with system 100. For example, a specific user interaction may be associated with a predetermined stored discomfort value. Continuing the example, if user 150 looks at thermostat 130 for a certain period of time, that user interaction may be associated with a stored discomfort value. Controller 120 may access these discomfort score values when determining the value to be associated with a specific user interaction (e.g., current user discomfort value). The discomfort score values may be saved as a table, matrix, chart, or any suitable data structure that controller 120 may access, for example, from memory 620 of FIG. 4.

At step 203, in some embodiments, controller 120 determines a temperature difference between a temperature of enclosed space 110 and the setpoint temperature (e.g., occupied setpoint temperature or unoccupied setpoint temperature). The temperature of enclosed space 110 may be sensed by thermostat 130. The occupied setpoint temperature may be a default setpoint included in system 100 or may be input and/or updated by user 150. In determining a temperature difference, controller 120 may analyze the temperature of enclosed space 110 and compare it to the occupied setpoint temperature. For example, during a cooling operation, if the temperature of enclosed space 110 is 75° F. and the occupied setpoint temperature is 70° F., then controller 120 would determine a temperature difference of 5° F. As another example, during a heating operating, if the temperature of the enclosed space is 68° F., and the occupied setpoint temperature is 72° F., then controller 120 may determine a temperature difference of 4° F.

Steps 205 and 207 generally involve actions related to the temperature difference determined in step 203. At step 205, in some embodiments, controller 120 determines whether the temperature difference determined in step 203 exceeds a threshold. If at step 205 controller 120 determines that the temperature difference does not exceed a threshold, the method ends. If at step 205 controller 120 determines the temperature difference exceeds the first threshold, the method continues to step 207. The first threshold may be stored in memory 620 of controller 120 (e.g., as shown in FIG. 4), it may be set and adjusted by a third party (e.g., manufacturer, dealer, or maintenance group), and/or set and adjusted by user 150. The first threshold is also configurable based on the mode of operation of system 100 as well as the time of year. As an example, if the temperature of enclosed space 110 is 75° F. and the occupied setpoint temperature is 70° F., controller 120 determines the temperature difference of 5° F. in step 203. Continuing the example, in step 205, controller 120 may compare this 5° F. of the temperature difference to a threshold, such as 3° F. In this example, controller 120 would determine that the temperature difference of 5° F. exceeds the threshold of 3° F.

At step 207, in some embodiments, controller 120 determines whether the temperature difference is increasing. If controller 120 determines that the temperature difference is not increasing, the method ends. In determining whether the temperature difference is increasing, controller 120 may repeat steps 203 and 205 over a period of time. For example, at a first time, if the temperature difference is determined in step 203 to be 3° F., and then the temperature difference at a second point in time is determined to be 5° F., controller 120 would determine at step 207 that the temperature difference is increasing. By determining whether the temperature difference is increasing at step 207, controller 120 may infer whether system 100 is experiencing any issues or may be broken. For example, if the temperature difference is not increasing, that indicates that system 100 is conditioning the air such that the temperature of enclosed space 110 is getting closer to the occupied setpoint temperature. For example, if at one point the temperature from thermostat 130 is 75° F. and at the next point in time the it is 73° F., while the occupied setpoint temperature is 70° F., that indicates that system 100 is working towards meeting the occupied setpoint temperature. If, however, controller 120 determines that the temperature difference is increasing at step 207 (e.g., temperature of enclosed space 110 is moving further away from the occupied setpoint temperature) then that may indicate an issue with system 100. If controller 120 determines the temperature difference is increasing at step 207, the method continues to step 209.

Step 209 and step 211, in some embodiments, generally involve user interactions with system 100. At step 209, in some embodiments, controller 120 receives data related to user interaction with system 100. Controller 120 may receive this information through its interface (e.g., interface 610 in FIG. 4). One example of data related to user interactions includes user 150 standing in front of thermostat 130, such as shown in user 151 of FIG. 1. Another example includes user 150 opening an application related to system 100 on mobile device 140 related to system 100 (e.g., one that user can check the settings and/or change any settings of the HVAC system). Another example of data related to user interactions includes user 150 changing a setting, for example changing an occupied setpoint temperature setting. The amount that the occupied setpoint temperature has changed may also be data related to user interactions.

At step 211, in some embodiments, controller 120 determines whether user 150 has interacted with system 100. Controller 120 may evaluate the data received in step 209 to determine whether user has interacted with system 100 or not. For example, if user 150 merely walks by thermostat 130, controller may receive data related to that, but after analyzing the data (e.g., proximity, length of time), determine that the data indicates that user has not interacted with system 100. In some embodiments, user 150 must stand in front of thermostat 130 for a specific period of time for controller 120 to register it as being a user interaction. If controller 120 determines that user has not interacted with system 100, the method ends. If controller 120 determines that user 150 has interacted with system 100 the method continues to step 213. Examples of user interactions with system 100 may include, but are not limited to: whether a user has been in proximity to thermostat 130 (and for how long), whether a user changed a setting of the HVAC system (e.g., occupied setpoint temperature, operation mode of heating and/or cooling, temperature range), the magnitude of any change (e.g., changing the occupied setpoint temperature by a certain number of degrees), whether a user opens an application related to system 100 while the user is within enclosed space 110, how quickly user 150 interacted with system 100 after the occupied setpoint temperature is not met (e.g., if a user notices immediately or when the temperature is only a degree or two off the occupied setpoint temperature, that may indicate a more sensitive user), and how many times the user has interacted with the system in a period of time (e.g., how many times did user 150 change the occupied setpoint temperature, how many times did user 150 check thermostat 130).

Step 213 and 215, in some embodiments, generally relate to determining a user's discomfort based on the user interaction with system 100 determined in step 211. At step 213 in some embodiments, controller 120 determines a current user discomfort value. Controller 120 may use data received in step 209, and discomfort score values stored in step 201, in order to determine the current user discomfort value. For example, controller 120 may determine at step 211 that user 150 stood in front of thermostat 130 and thus interacted with system 100. Controller 120 may access discomfort score values to receive a value associated with that user interaction. For example, user 150 standing in front of thermostat 130 may receive a stored discomfort value of 0.5. In determining a current user discomfort value at step 213, controller 120 may multiply that 0.5 stored discomfort value by the amount of time that user 150 stood in front of thermostat 130. The longer user 150 stands in front of thermostat 130, this indicates the higher the user discomfort. As another example, 150 may open an application related to system 100 in mobile device 140. Opening the application may be associated with a stored discomfort value of 2.0. In determining a current user discomfort value, controller 120 may determine that user 150 opened the application and thus determined a current user discomfort value of 2.0. In determining a current user discomfort value, controller 120 determines a value associated with the data received in step 209. In some embodiments, steps 209, 211 and 213 may be repeated as there are additional user interactions with system 100.

At step 215, in some embodiments, controller 120 updates the accumulated user discomfort value based on the current user discomfort value determined in step 213. The accumulated user discomfort value may be stored in memory of controller 120 (e.g., memory 620 of FIG. 4), as indicated in step 201. The accumulated user discomfort value is updated from its original value at step 215 as more user interactions are determined. In updating the accumulated user discomfort value, controller 120 may use the current user discomfort value determined in step 213. For example, if user 150 stands in front of thermostat 130 for 2 seconds, the current user discomfort value determined in step 213 may be 1.0. Thus the accumulated user discomfort value would be set to 1.0. If controller 120 then determines that user 150 opened mobile device 140, which has a stored discomfort value of 2.0, controller 120 may determine the current user discomfort value is 2.0, and thus update the accumulated user discomfort value in step 213 to be 3.0 (e.g., 1.0+2.0). In some embodiments controller 120 may update the accumulated user discomfort value by adding, multiplying, combining, adjusting or arranging the current user discomfort values determined in step 213. In some embodiments, the accumulated user discomfort value may be reset after a certain period of time (e.g., every day, every 12 hours, every hour, etc.) and/or after each user discomfort event has occurred (e.g., as explained below in steps 217 and 219).

At step 217, in some embodiments, controller 120 determines whether the accumulated user discomfort value exceeds a second threshold. If controller 120 determines the accumulated user discomfort value does not exceed a second threshold, the method ends. The second threshold may be determined by system 100, and may be adjustable remotely, for example, by a manufacturer or other third party. By determining whether the accumulated user discomfort value exceeds a second threshold, controller 120 determines whether user 150 is experiencing discomfort. For example, if user 150 merely gets up and looks at thermostat 130 for 1 second, that may be an insufficient accumulated user discomfort value to exceed a second threshold. In other words, it may indicate that user is not experiencing any significant discomfort. If, as another example, user 150 stands in front of thermostat 130 for 2 seconds (or opens the application related to system 100 on mobile device 140), and changes the occupied setpoint temperature by 5 degrees, then that accumulated user discomfort value may be significantly higher. If that accumulated user discomfort value exceeds the second threshold, that may indicate that the user is experiencing discomfort. If at step 217, controller 120 determines the accumulated user discomfort value exceeds the second threshold, the method continues to step 219.

At step 219, in some embodiments, controller 120 generates an alert indicating that a user discomfort alert has occurred. This alert may include an indication that a user discomfort has occurred, the accumulated user discomfort value, the amount that the accumulated user discomfort value exceeds the second threshold, or any other relevant information. In some embodiments the alert may be an email, a text message, a message, a display, a heat map, a location, a user, an account name, an account number, an address, or any suitable format to relay information. In some embodiments, multiple alerts from multiple systems 100, such that it indicates the accumulated user discomfort value at various locations. For example, the alert may include a heat map showing multiple locations of different systems 100, with different size circles indicating the magnitude of the accumulated user discomfort value is. For example, the larger the accumulated user discomfort value, the larger the circle on the heat map would be. This would allow the entity receiving the alert to determine which system 100 is experiencing the most user discomfort. In some embodiments the alert may be a prioritized list of different systems 100, to indicate which system 100 has a user 150 experiencing the most discomfort.

At step 221, in some embodiments, controller 120 transmits the alert generated in step 219 to the third party. The third party may be a manufacturer, dealer, system coordinator, another user 150, or any party that may benefit from the information included in the alert. The alert, for example, may indicate to the manufacturer that user 150 is experiencing discomfort. If the third party is, for example, responsible for delivering maintenance, then the third party may call user 150 on mobile device 140 to schedule an appointment for maintenance of system 100. This may be beneficial in that user 150 does not have to initiate any call or request for maintenance, but rather the manufacturer understands that the user may be experiencing discomfort and initiate the maintenance based on that. In some embodiments the alert may be received by user 150, or another user, indicating that system 100 may require maintenance. In that case, user 150 may request maintenance of a third party on its own. After transmitting the alert to the third party the method then ends.

Modifications, additions, or omissions may be made to method 200 depicted in FIG. 2. Method 200 may include more, fewer, or other steps. For example, steps may be performed in parallel or in any suitable order, and steps may be omitted. While discussed as various components of System 100 performing the steps, any suitable component or combination of components of System 100 may perform one or more steps of the method.

Figure 3:
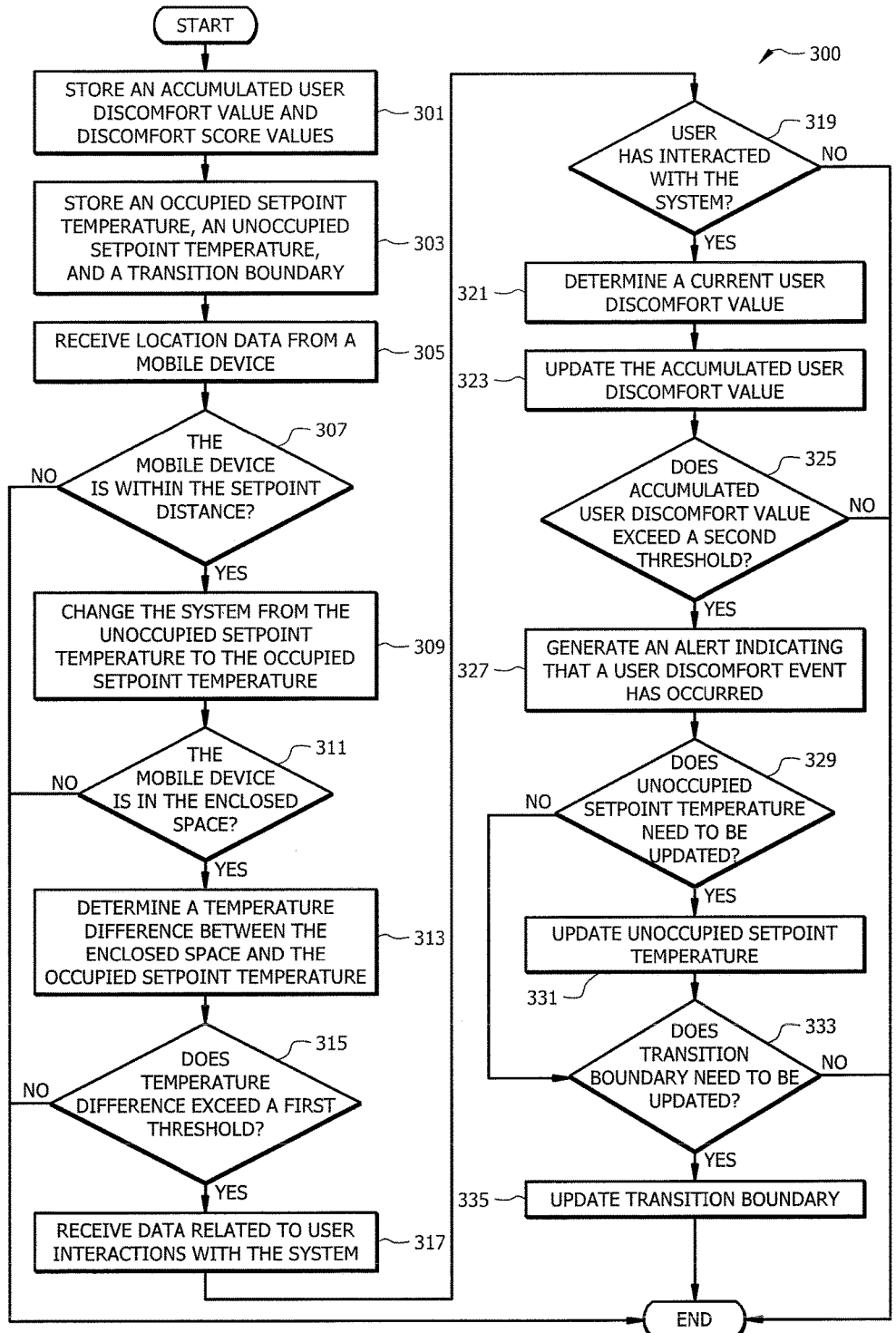
FIG. 3 is a flowchart illustrating a method of operating the example HVAC system of FIG. 1.

FIG. 3 is a flowchart illustrating method 300, a method of operating the example System 100 of FIG. 1. In method 300, generally, system 100 includes a geofencing feature, which allows user 150 to keep enclosed space 110 at an unoccupied setpoint temperature while user 150 is outside enclosed space. Once user 150 is within a certain distance away (e.g., radius or transition boundary), system 100 begins to condition the air such that enclosed space 110 reaches the occupied setpoint temperature at or before the arrival of user 150. However, if the components are not set correctly, enclosed space 110 may be at an uncomfortable temperature when user 150 arrives. If user 150 interacts with the HVAC system (e.g., opening the application on mobile device 140 and/or looking at thermostat 130), system 100 may detect that user 150 is experiencing discomfort, and take remedial action by either adjusting the unoccupied setpoint temperature and/or the transition boundary at which it begins to provide conditioned air. Method 300 begins at step 301.

In some embodiments, the method starts at step 301 where controller 120 stores an accumulated user discomfort value and discomfort score values. In some embodiments, one or more aspects of step 301 may be implemented using one or more techniques discussed above with respect to step 201 of method 200, illustrated in FIG. 2.

At step 303, in some embodiments, controller 120 stores an occupied setpoint temperature, unoccupied setpoint temperature, and transition boundary. The occupied setpoint temperature may be the temperature desired by user 150 for enclosed space 110. This may be the temperature by which user 150 feels most comfortable at that time of day. An unoccupied setpoint temperature may be a temperature for enclosed space 110 when user 150 is not present or when enclosed space 110 is unoccupied. This may be the temperature that saves the most energy and keeps enclosed space 110 at a safe temperature, but not at a comfort level. For example, an occupied setpoint temperature may be 72° F. and the unoccupied setpoint temperature may be 78° F., allowing user 150 to save energy and expense by having a higher unoccupied setpoint temperature than an occupied setpoint temperature. In some embodiments, user 150 may set system 100 to the unoccupied setpoint temperature even when user 150 is within enclosed space 110 (e.g., user 150 sets system 100 to "away mode" even while at home). A transition boundary may be the distance away that user 150 is when system 100 starts to condition the air for enclosed space 110. Once user 150 crosses within the transition boundary (e.g., is a specific distance away from enclosed space 110), system 100 may change the setting from the unoccupied setpoint temperature to the occupied setpoint temperature in order to start heating or cooling enclosed space 110 such that enclosed space reaches the occupied setpoint temperature before user 150 arrives back. For example, if the unoccupied setpoint temperature is 78° F. and the occupied setpoint temperature is 72° F., system 100 may begin cooling down enclosed space 110 from 78° F. to 72° F. when the user 150 is a certain distance (e.g., transition boundary) away from enclosed space 110. For example, when user 150 is five miles away from enclosed space 110, system 100 may begin to cool the air such that enclosed space 110 is at the occupied setpoint temperature when user 150 arrives home.

Steps 305, 307, and 309 generally relate to geofencing and ensuring that the temperature of enclosed space 110 is at the desired occupied setpoint temperature once user 150 arrives home. At step 305, in some embodiments, system 100 may receive location data from mobile device 140 that is with user 150. The location data may be received through WiFi, GPS, or any other location recognizing system. At step 307, in some embodiments, controller 120 determines whether the mobile device is within the transition boundary. The transition boundary is that stored in step 303 and is the distance at which system 100 would begin conditioning the air for enclosed space 110. For example, the transition boundary may be one mile, five miles, twenty miles, or any sufficient distance such that the enclosed space 110 reaches the occupied setpoint temperature by the time user 150 arrives home. At step 307, in some embodiments, controller 120 determines whether mobile device 140 is within the transition boundary. For example, when user 150 is exactly five miles away, if that is the transition boundary, then controller 120 would determine mobile device 140 is within the transition boundary. If controller 120 determines mobile device 140 is not within the transition boundary, then enclosed space 110 would remain at the unoccupied setpoint temperature setting and the method ends. If at step 307, controller 120 determines mobile device 140 is within the transition boundary, the method continues to step 309 where controller 120 may change system 100 from the unoccupied setpoint temperature to the occupied setpoint temperature. At step 309, controller may determine that user 150 is within the transition boundary (e.g., on the way home) and determines that system 100 needs to begin conditioning the air in enclosed space 110 to update the temperature of enclosed space 110. For example, if the unoccupied setpoint temperature during the winter is 68° F. and the occupied setpoint temperature is 73° F., controller 120 would change the occupied setpoint temperature from 68° F. to 73° F. when user 150 is the transition boundary away so that enclosed space 110 may be heated for user 150.

At step 311, in some embodiments, controller 120 determines whether mobile device 140 is within enclosed space 110. This may indicate that user 150 has arrived home. Step 311 may occur a certain period of time after steps 307 and 309. For example, it may take user 150 ten minutes to go from the transition boundary, for example five miles away, to being home in the enclosed space 110. If controller 120 determines mobile device 140 is not within enclosed space 110, that indicates that user 150 is not home and the system continues to condition the air and prepare for user's arrival. If at step 311 mobile device 140 is within enclosed space 110, the method continues to step 313 where controller 120 determines a temperature difference between temperature of the enclosed space and the setpoint temperature. If system 100 is operating appropriately, the temperature difference of enclosed space 110 the occupied setpoint temperature would be close to zero (e.g., system 100 has met the occupied setpoint temperature by the time user 150 arrives home). Continuing the example from above, if the temperature of enclosed space 110 reaches 73° F., which is the occupied setpoint temperature, by the time mobile device 140 is within enclosed space 110, then the temperature difference would be zero. In some embodiments, one or more aspects of step 313 may be implemented using one or more techniques discussed above with respect to step 203 of method 200 illustrated in FIG. 2. Steps 315 through 327 generally analyze the temperature and any temperature difference, analyze system user interactions with system 100 and calculate user discomfort values to determine whether a user discomfort event has occurred. In some embodiments, steps 315, 317, 319, 321, 323, 325, 325, and 327 be implemented using one or more techniques discussed above with respect to steps 205, 209, 211, 213, 215, 217 and 219 of FIG. 2, respectively.

Step 329 through step 335 generally involves a scenario where there is a temperature difference determined at step 313, and enclosed space 110 is not reaching the occupied setpoint temperature by the time user 150 arrives home. In this case, system 100 may be automatically adjusted such that in the future, enclosed space 110 may reach occupied setpoint temperature by the time that user 150 arrives home. At step 329, in some embodiments, controller 120 determines whether the unoccupied setpoint temperature needs to be updated. If the unoccupied setpoint temperature is too different of a magnitude of the occupied setpoint temperature, it may take too much time for system 100 to condition the air in enclosed space 110 to reach the occupied setpoint temperature in sufficient time. For example, if the occupied setpoint temperature is 70° F. and the unoccupied setpoint temperature is 85° F., that difference of 15 degrees may be too large in magnitude for system 100 to condition the air in enclosed space 110 before user 150 arrives home. Controller 120 may determine unoccupied setpoint temperature needs to be updated based on magnitude of difference of unoccupied setpoint temperature and the occupied setpoint temperature, the amount of time it takes user 150 to go from the transition boundary to arriving to enclosed space 110, and/or other metrics. If at step 329, controller 120 determines that the unoccupied setpoint temperature needs to be updated, the method continues to step 331 and controller 120 automatically updates the unoccupied setpoint temperature. By updating the unoccupied setpoint temperature, and making it closer to the occupied setpoint temperature, this provides a greater likelihood that enclosed space 110 will reach the occupied setpoint temperature by the time user 150 arrives home. This may limit the resources expended by system 100, improve the efficiency of system 100, and provide greater customer satisfaction such that user 150 will experience fewer user discomfort events. If at step 329 controller 120 determines the unoccupied setpoint temperature does not need to be updated, the method continues to step 333.

At step 333, in some embodiments, controller 120 determines whether the transition boundary needs to be updated. If controller 120 determines the transition boundary does not need to be updated then the method ends. For example, if controller 120 previously updated the unoccupied setpoint temperature in step 331, controller 120 may determine that the transition boundary does not need updating. In some embodiments, controller 120 may determine the transition boundary needs to be updated so that system 100 may begin to condition the air in enclosed space 110 when user 150 is further away from enclosed space 110. By increasing the transition boundary, that allows system 100 more time to condition the air in enclosed space 110, thus meeting the occupied setpoint temperature by the time user 150 arrives home. Controller 120 may determine the transition boundary needs to be updated based on whether the unoccupied setpoint temperature was previously updated, the magnitude of the user discomfort determined in step 325, and the amount of time it takes user 150 to go from the transition boundary to enclosed space 110. If at step 333 controller 120 determines that transition boundary needs to be updated, the method continues to step 335 where controller 120 updates the transition boundary. In some embodiments, controller 120 may update both the unoccupied setpoint temperature and the transition boundary. This allows for both to be slightly adjusted, rather than one setting to be drastically adjusted. After updating the transition boundary, the method ends.

Modifications, additions, or omissions may be made to method 200 depicted in FIG. 3. Method 300 may include more, fewer, or other steps. For example, steps may be performed in parallel or in any suitable order, and steps may be omitted. While discussed as various components of System 100 performing the steps, any suitable component or combination of components of System 100 may perform one or more steps of the method.

FIG. 4 illustrates an example controller 120 for an HVAC system, such as controller 120 of FIG. 1, according to certain embodiments of the present disclosure. Controller 120 may comprise one or more interfaces 610, memory 620, and one or more processors 630. Interface 610 may comprise hardware and/or software. Interface 610 receives input (e.g., sensor data or system data), sends output (e.g., instructions), processes the input and/or output, and/or performs other suitable operation. As examples, interface 610 receives information from sensors, such as information about the ambient temperature of the enclosed space that the HVAC system is heating and/or cooling, receives information about the heating or cooling load, receives data related to user interactions with the system, and can transmit alerts, such as an alert that a user discomfort event has occurred.

Processor 630 may include any suitable combination of hardware and software implemented in one or more modules to execute instructions and manipulate data to perform some or all of the described functions of controller 120. In some embodiments, processor 630 may include, for example, one or more computers, one or more central processing units (CPUs), one or more microprocessors, one or more applications, one or more application specific integrated circuits (ASICs), one or more field programmable gate arrays (FPGAs), and/or other logic. As examples, processor 630 may determine a temperature difference between an enclosed space and the setpoint temperature of a system, determine whether that temperature difference exceeds a threshold, whether the temperature difference is increasing, determine whether a user has interacted with the system, and determine whether a user discomfort event has occurred.

Memory (or memory unit) 620 stores information. As an example, a memory may store an accumulated user discomfort value (e.g., to keep track of user discomfort interactions over a period of time) and discomfort score values, which associate values to a specific interaction user has with system 100. Memory 620 may comprise one or more non-transitory, tangible, computer-readable, and/or computer-executable storage media. Examples of memory 620 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to the systems, apparatuses, and methods described herein without departing from the scope of the disclosure. The components of the systems and apparatuses may be integrated or separated. Moreover, the operations of the systems and apparatuses may be performed by more, fewer, or other components. For example, System 100 may include any number of controllers 120, enclosed spaces 110, thermostats 130, mobile devices 140, and users 150, and so on, as performance demands dictate. One skilled in the art will also understand that System 100 can include other components that are not illustrated but are typically included with HVAC systems. Additionally, operations of the systems and apparatuses may be performed using any suitable logic comprising software, hardware, and/or other logic. As used in this document, "each" refers to each member of a set or each member of a subset of a set.

Although this disclosure has been described in terms of certain embodiments, alterations and permutations of the embodiments will be apparent to those skilled in the art, and it is intended that the present disclosure encompass such changes, variations, alterations, transformations, and modifications as fall within the scope of the appended claims. Accordingly, the above description of the embodiments does not constrain this disclosure. Other changes, substitutions, and alterations are possible without departing from the spirit and scope of this disclosure.

The invention claimed is:

1. A controller for a heating, ventilation, and air conditioning (HVAC) system operating in an enclosed space, comprising:
an interface configured to:
receive data related to user interactions with the system, wherein the data related to user interactions with the system comprises the number of times a user has interacted with a component of the system; and
receive a temperature of the enclosed space;
a memory configured to store an accumulated user discomfort value and discomfort score values, the discomfort score values associated with user interactions; and
a processor communicatively coupled to the memory and the interface, the processor configured to:

determine a temperature difference, the temperature difference being a difference between the temperature of the enclosed space and a setpoint temperature;
determine whether the temperature difference exceeds a first threshold;
in response to determining that the temperature difference exceeds the first threshold, determine whether a user has interacted with the system based on the data related to user interactions;
in response to determining that the user has interacted with the system based on the data related to user interactions:
  determine a current user discomfort value based on the discomfort score values;
  update the accumulated user discomfort value based on the current user discomfort value;
  determine whether the accumulated user discomfort value exceeds a second threshold; and
  in response to determining that the accumulated user discomfort value exceeds a second threshold:
    generate an alert indicating that a user discomfort event has occurred; and
    causing conditioned air to be provided to the enclosed space.

2. The controller of claim 1, wherein:
the processor is further configured to:
  determine whether the temperature difference is increasing; and
  in response to determining that the user has interacted with the system and that the temperature difference is increasing, determine that the alert indicating that the user discomfort event has occurred be transmitted to a third party; and
the interface is further configured to transmit the alert to the third party.

3. The controller of claim 2, wherein the alert to the third party includes a heat map, indicating the accumulated user discomfort value.

4. The controller of claim 1, wherein:
the interface is further configured to receive location data from a mobile device;
the memory is further configured to store an unoccupied setpoint temperature, the unoccupied setpoint temperature being used when the mobile device is outside a transition boundary from the HVAC system; and
the processor is further configured to:
  determine whether the mobile device is in the enclosed space, based on the location data from the mobile device; and
  in response to determining that the user has interacted with the system, that the temperature difference exceeds the first threshold, and that the mobile device is in the enclosed space, determine that the alert indicating that the user discomfort event has occurred be transmitted to the mobile device.

5. The controller of claim 4, wherein the processor is further configured to, in response to determining that the user has interacted with the system, that the temperature difference exceeds the first threshold, and that the mobile device is in the enclosed space:
  determine whether to update the unoccupied setpoint temperature; and
  determine whether to update the transition boundary.

6. The controller of claim 1, wherein the data related to user interactions with the system indicates a proximity of the user to a thermostat for a period of time.

7. The controller of claim 1, wherein the data related to user interactions with the system indicates a change in the setpoint temperature.

8. A heating, ventilation, and air conditioning (HVAC) system operating in an enclosed space, the HVAC system comprising:
a thermostat in the enclosed space, the thermostat configured to display information to a user and receive instructions from the user;
a mobile device, the mobile device configured to display information to a user and receive instructions from the user;
a controller communicatively coupled to the thermostat and the mobile device, the controller configured to:
  store an accumulated user discomfort value and discomfort score values, the discomfort score values associated with user interactions;
  receive a temperature of the enclosed space;
  determine a temperature difference, the temperature difference being a difference between the temperature of the enclosed space and a setpoint temperature;
  determine whether the temperature difference exceeds a first threshold;
  receive data related to user interactions with the system, wherein the data related to user interactions with the system comprises the number of times a user has interacted with a component of the system;
  in response to determining that the temperature difference exceeds the first threshold, determine whether a user has interacted with the system based on the data related to user interactions;
  in response to determining that the user has interacted with the system based on the data related to user interactions:
    determine a current user discomfort value based on the discomfort score values;
    update the accumulated user discomfort value based on the current user discomfort value;
    determine whether the accumulated user discomfort value exceeds a second threshold; and
    in response to determining that the accumulated user discomfort value exceeds a second threshold:
      generate an alert indicating that a user discomfort event has occurred; and
      cause conditioned air to be provided to the enclosed space.

9. The HVAC system of claim 8, wherein the controller is further configured to:
  determine whether the temperature difference is increasing; and
  in response to determining that the user has interacted with the system and that the temperature difference is increasing, determine that the alert indicating that the user discomfort event has occurred be transmitted to a third party; and
  transmit the alert to the third party.

10. The HVAC system of claim 9, wherein the alert to the third party includes a heat map, indicating the accumulated user discomfort value.

11. The HVAC system of claim 8, wherein the controller is further configured to:
  store an unoccupied setpoint temperature, the unoccupied setpoint temperature being used when the mobile device is outside a transition boundary from the HVAC system;
  receive location data from a mobile device;

determine whether the mobile device is in the enclosed space, based on the location data from the mobile device; and in response to determining that the user has interacted with the system, that the temperature difference exceeds the first threshold, and that the mobile device is in the enclosed space, determine that the alert indicating that the user discomfort event has occurred be transmitted to the mobile device.

12. The HVAC system of claim 11, wherein the controller is further configured to, in response to determining that the user has interacted with the system, that the temperature difference exceeds the first threshold, and that the mobile device is in the enclosed space:

determine whether to update the unoccupied setpoint temperature; and determine whether to update the transition boundary.

13. The HVAC system of 8, wherein the data related to user interactions with the system indicates a proximity of the user to a thermostat for a period of time.

14. The HVAC system of 8, wherein the data related to user interactions with the system indicates a change in the setpoint temperature.

15. A non-transitory computer readable medium comprising instructions which, when executed by a computer, cause the computer to:

store an accumulated user discomfort value and discomfort score values, the discomfort score values associated with user interactions;

receive a temperature of the enclosed space;

determine a temperature difference, the temperature difference being a difference between the temperature of the enclosed space and a setpoint temperature;

determine whether the temperature difference exceeds a first threshold;

receive data related to user interactions with the system, wherein the data related to user interactions with the system comprises the number of times a user has interacted with a component of the system;

in response to determining that the temperature difference exceeds the first threshold, determine whether a user has interacted with the system based on the data related to user interactions;

in response to determining that the user has interacted with the system based on the data related to user interactions:

determine a current user discomfort value based on the discomfort score values;

update the accumulated user discomfort value based on the current user discomfort value;

determine whether the accumulated user discomfort value exceeds a second threshold; and in response to determining that the accumulated user discomfort value exceeds a second threshold:

generate an alert indicating that a user discomfort event has occurred; and cause conditioned air to be provided to the enclosed space.

16. The non-transitory computer readable medium of claim 15, further comprising instructions which, when executed by a computer, cause the computer to:

determine whether the temperature difference is increasing; and in response to determining that the user has interacted with the system and that the temperature difference is increasing, determine that the alert indicating that the user discomfort event has occurred be transmitted to a third party; and transmit the alert to the third party.

17. The non-transitory computer readable medium of claim 16, wherein the alert to the third party includes a heat map, indicating the accumulated user discomfort value.

18. The non-transitory computer readable medium of claim 15, further comprising instructions which, when executed by a computer, cause the computer to:

store an unoccupied setpoint temperature, the unoccupied setpoint temperature being used when the mobile device is outside a transition boundary from the HVAC system;

receive location data from a mobile device;

determine whether the mobile device is in the enclosed space, based on the location data from the mobile device; and in response to determining that the user has interacted with the system, that the temperature difference exceeds the first threshold, and that the mobile device is in the enclosed space, determine that the alert indicating that the user discomfort event has occurred be transmitted to the mobile device.

19. The non-transitory computer readable medium of claim 18, further comprising instructions which, when executed by a computer, cause the computer to, in response to determining that the user has interacted with the system, that the temperature difference exceeds the first threshold, and that the mobile device is in the enclosed space:

determine whether to update the unoccupied setpoint temperature; and determine whether to update the transition boundary.

20. The non-transitory computer readable medium of claim 15, wherein the data related to user interactions with the system indicates a proximity of the user to a thermostat for a period of time.

* * * * *